United States Patent [19]

Ishikawa et al.

[11] Patent Number: 5,020,053
[45] Date of Patent: May 28, 1991

[54] CHANNEL ACCESS SYSTEM

[75] Inventors: Minoru Ishikawa, Tochigi; Nobuki Nakata, Kawasaki, both of Japan

[73] Assignee: Fujitsu Limited, Kawasaki, Japan

[21] Appl. No.: 510,198

[22] Filed: Apr. 17, 1990

[30] Foreign Application Priority Data

Apr. 17, 1989 [JP] Japan .................................. 1-96992

[51] Int. Cl.⁵ ............................................... H04J 3/22
[52] U.S. Cl. .................................. 370/84; 370/111.1; 370/85.1; 370/85.15
[58] Field of Search ...................... 370/110.1, 84, 85.1, 370/85.15, 47

[56] References Cited

U.S. PATENT DOCUMENTS

| 4,580,259 | 4/1986 | Harada et al. | 370/110.1 |
| 4,627,047 | 12/1986 | Pitroda et al. | 370/110.1 |
| 4,813,040 | 3/1989 | Futato | 370/110.1 |
| 4,815,105 | 3/1989 | Bottoms et al. | 375/7 |
| 4,864,562 | 9/1989 | Murakami et al. | 370/84 |
| 4,924,458 | 5/1990 | Obara | 370/85.1 |

FOREIGN PATENT DOCUMENTS

| 0111450 | 7/1983 | Japan | 370/84 |
| 38047 | of 1987 | Japan . | |

Primary Examiner—Douglas W. Olms
Assistant Examiner—Dang Ton
Attorney, Agent, or Firm—Staas & Halsey

[57] ABSTRACT

A channel access system comprises n channel parts for receiving m channels of voice signals and for outputting voice frequency data and signaling data, and a multiplexer part for receiving the voice frequency data and the signaling data of the m channel from the n channel parts and for supplying channel access signals to the n channel parts for designating a channel of the voice frequency data, where each of the n channel parts include a coder for coding a corresponding one of the voice signals into one of the voice frequency data, a decoder for decoding the channel access signals and for generating a synchronizing signal which is synchronized to a corresponding one of the channel access signals which designates its own channel, a signaling converter for converting the corresponding one of the signaling signals into a corresponding one of the signaling data, and a speed converting circuit for converting a transmission speed of the signaling data from a first transmission speed to a second transmission speed which is higher than the first transmission speed. The synchronizing signal controls a coding timing of the coder and a speed conversion timing of the speed converting circuit.

9 Claims, 3 Drawing Sheets

CHANNEL ACCESS SYSTEM

BACKGROUND OF THE INVENTION

The present invention generally relates to channel access systems, and more particularly to a channel access system for a PCM first order terminal equipment.

In a PCM first order terminal equipment which employs a distributed processing in which a signal from a switching system is converted into a PCM signal in each channel, there has been much progress in making the internal structure of the terminal equipment in the form of a large scale integrated circuit (LSI). For this reason, the size of the terminal equipment is reduced, and consequently, there are demands to reduce the line density between a channel part and a multiplexer part.

FIG. 1 shows an example of a conventional channel access system. The channel access system generally comprises n channel parts $11_1$ through $11_n$ and a multiplexer part 12. The n channel parts $11_1$ through $11_n$ have the same structure and only the structure of the channel part $11_1$ is shown for the sake of convenience. In addition, FIG. 1 shows only a transmission system of a CEPT (Conference of European Postal and Telecommunication Administrations) system PCM first order terminal equipment for the sake of convenience, but a reception system of the CEPT system PCM first order terminal equipment operates similarly to the transmission system.

The channel part $11_1$ comprises a transformer 13, a PCM coder 14, a signaling converter 15, and decoders 16 and 17 which are connected as shown for one channel. FIG. 1 shows only the structure of the channel part $11_1$ for one channel, but the channel part $11_1$ may include the transformer 13, the PCM coder 14, the signaling converter 15, and the decoders 16 and 17 may be provided for a plurality of channels.

An analog signal from a switching system (not shown) is supplied to the PCM coder 14 via the transformer 13 of the channel part $11_1$. On the other hand, the analog signal from the switching system is supplied to the signaling converter 15 via a primary side of the transformer 13. The PCM coder 14 receives a first synchronizing signal SYNC1 from the decoder 16 and converts an input analog voice signal into a PCM signal in synchronism with the first synchronizing signal SYNC1.

The signaling converter 15 converts the analog signal into a signaling data SIG on a PCM line based on a second synchronizing signal SYNC2 which is received from the decoder 17.

The PCM signal which is obtained in the PCM coder 14 is supplied to a voice multiplexer 18 of the multiplexer part 12 as a voice frequency data VF. This voice multiplexer 18 multiplexes the voice frequency data VF with voice frequency data from the other channels. The voice multiplexer 18 also supplies channel access signals to each of the channel parts $11_1$ through $11_n$. For example, the decoder 16 receives the channel access signals from the voice multiplexer 18 and detects a channel access signal which designates its own channel by decoding the channel access signals. The decoder 16 supplies the first synchronizing signal SYNC1 to the PCM coder 14 whenever the channel access signal for that channel is detected.

A signaling multiplexer 19 of the multiplexer part 12 adds a multiframe pattern to the signaling data SIG which is received from the signaling converter 15 and to signaling data which are received from other channels. The signaling multiplexer 19 then time-division-multiplexes these signaling data based on the timing signals which are received from the voice multiplexer 18. A signaling time division multiplexed signal from the signaling multiplexer 19 is supplied to the voice multiplexer 18. On the other hand, the signaling multiplexer 19 supplies a channel access signal of the signaling system to the decoder 17.

The voice multiplexer 18 time-division-multiplexes the voice frequency data VF and the signaling time division multiplexed signal according to a predetermined rule and generates a digital signal by adding a frame pattern to the time division multiplexed signal. For example, one frame of the digital signal is made up of a total of 32 time slots "0" through "31" each having 8 bits. The frame pattern is arranged in the time slot "0". On the other hand, the multi-frame pattern for the signaling data SIG and the signaling data SIG are arranged in the time slot "16". The voice frequency data VF of each of the channels are arranged in the remaining 30 time slots. In this case, the digital signal having the structure of a 30-channel PCM system is transmitted to the PCM line at a transmission speed of 2.048 Mbit/s.

However, according to the conventional channel access system, the channel access signal of the voice frequency system supplied from the voice multiplexer 18 to the decoder 16 and the channel access signal of the signaling system which is supplied from the signaling multiplexer 19 to the decoder 17 are mutually independent. This is because the transmission speed of the signaling data SIG is considerably slower than the transmission speed of the voice frequency data VF. For example, the transmission speed of the voice frequency data VF is 1.984 Mbit/s while the transmission speed of the signaling data SIG is 64 kbit/s.

For this reason, independent transmission lines are required for the channel access signal of the voice frequency system and the channel access signal of the signaling system. As a result, a large number of lines are required between the channel parts $11_1$ through $11_n$ and the multiplexer part 12 and it is necessary to use connectors having a large number of pins. In addition, even when parts of the channel parts $11_1$ through $11_n$ and the multiplexer part 12 are reduced in size and made in the form of printed circuits, a large number of lines are still required to make the necessary connections. Consequently, the line density of the backboard becomes relatively high and a multi-level printed circuits must be used for the backboard. Therefore, there is a problem in that the channel access system becomes expensive due to the large number of lines which are required to make the necessary connections.

SUMMARY OF THE INVENTION

Accordingly, it is a general object of the present invention to provide a novel and useful channel access system in which the problems described above are eliminated.

Another and more specific object of the present invention is to provide a channel access system comprising n channel parts for receiving m channels of voice signals and for outputting voice frequency data and signaling data. The channel access system also has a multiplexer part for receiving the voice frequency data and the signaling data of the m channels from the n channel parts. The multiplexer part also supplies channel access signals to the n channel parts for designating a channel of the voice frequency data, where each of the n channel parts include a coder for coding a corresponding one of the voice signals into one of the voice frequency data. The channel access system has decoder for decoding the channel access signals and for generating a synchronizing signal which is synchronized to a corresponding one of the channel access signals which designates a particular channel. The channel access system also has a signaling converter for converting a corresponding one of the voice signals into a corresponding one of the signaling data, and a speed converting circuit for converting the transmission speed of the signaling data from a first transmission speed to a second transmission speed which is higher than the first transmission speed. The synchronizing signal controls a coding timing of the coder and a speed conversion timing of the speed converting circuit. According to the channel access system of the present invention, it is possible to considerably reduce the number of transmission lines required to connect the channel part and the multiplexer part and also the number of pins of connectors. In addition, the line density of the backboard is reduced so that the cost and size of the backboard can be reduced. Therefore, it is possible to suppress the increase of the circuit scale when the system is produced in the form of a large scale integrated circuit.

Other objects and further features of the present invention will be apparent from the following detailed description when read in conjunction with the accompanying drawings.

DESCRIPTION OF THE PREFERRED EMBODIMENTS

Figure 2:
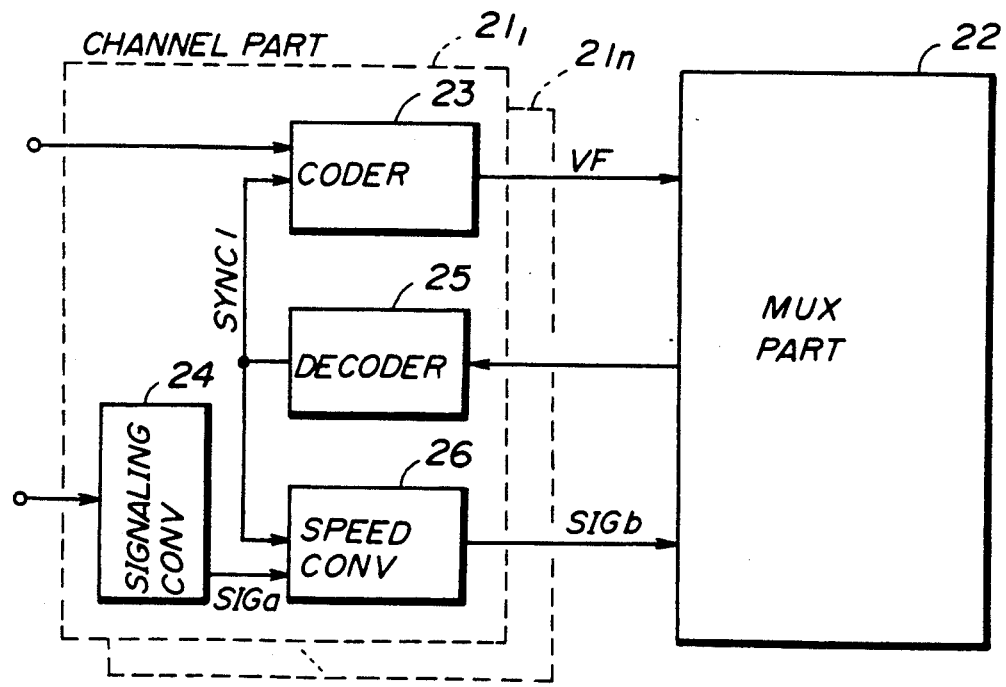
FIG. 2 is a system block diagram for explaining an operating principle of a channel access system according to the present invention.

First, a description will be given of an operating principle of a channel access system according to the present invention, by referring to FIG. 2. The channel access system generally comprises n channel parts $21_1$ through $21_n$ and a multiplexer part 22. The n channel parts $21_1$ through $21_n$ have the same structure and only the structure of the channel part $21_1$ is shown for the sake of convenience. The channel part $21_1$ comprises a coder 23, a signaling converter 24, a decoder 25 and a speed converting circuit 26 which are connected as shown for one channel. FIG. 2 shows only the structure of the channel part $21_1$ of a transmission system for one channel. But in actual practice, there are m channels.

The coder 23 supplies a voice frequency data VF to the multiplexer part 22, and the signaling converter 24 supplies a signaling data SIGa to the speed converting circuit 26. The decoder 25 decodes a channel access signal from the multiplexer part 22 and generates a synchronizing signal SYNC1 which is synchronized to one of the channel access signals which designates a particular channel. This synchronizing signal SYNC1 is supplied to the coder 23 and the speed converting circuit 26. The speed converting circuit 26 converts the signaling data SIGa from the signaling converter 24 into a signaling data SIGb which has a transmission speed approximately equal to that of the voice frequency data VF based on the synchronizing signal SYNC1, and the signaling data SIGb is supplied to the multiplexer part 22.

Figure 1:
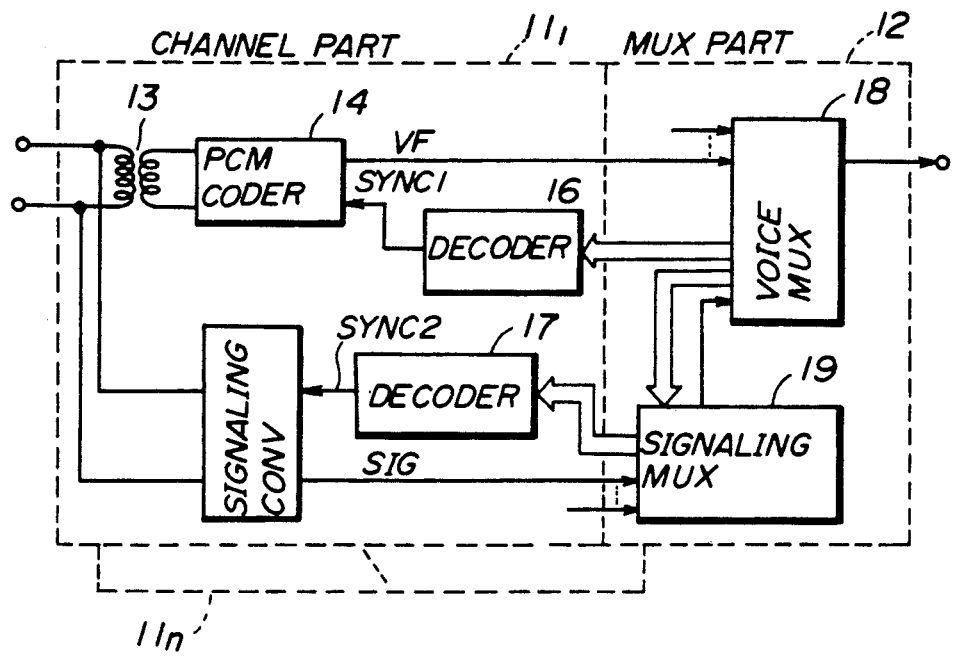
FIG. 1 is a system block diagram showing an essential part of an example of a conventional channel access system.

In the case of the conventional channel access system shown in FIG. 1, the multiplexer part 12 supplies to the channel part $11_1$ a first channel access signal for the voice frequency data VF and a second channel access signal for the signaling data SIGb which has a sufficiently low transmission speed compared to that of the voice frequency data VF.

On the other hand, according to the present invention, the speed converting circuit 26 converts the transmission speed of the signaling data SIGa which is output from the signaling converter 24 into a transmission speed which is approximately the same as the transmission speed of the voice frequency data VF. For this reason, the synchronizing signal SYNC1 which is output from the decoder 25 can be used for synchronizing the transmission of not only the voice frequency data VF but also the signaling data SIGb. Accordingly, there is no need to use two channel access signals as in the case of the conventional channel access system, and the transmission lines can be reduced by an amount corresponding to one channel access signal.

Figure 3:
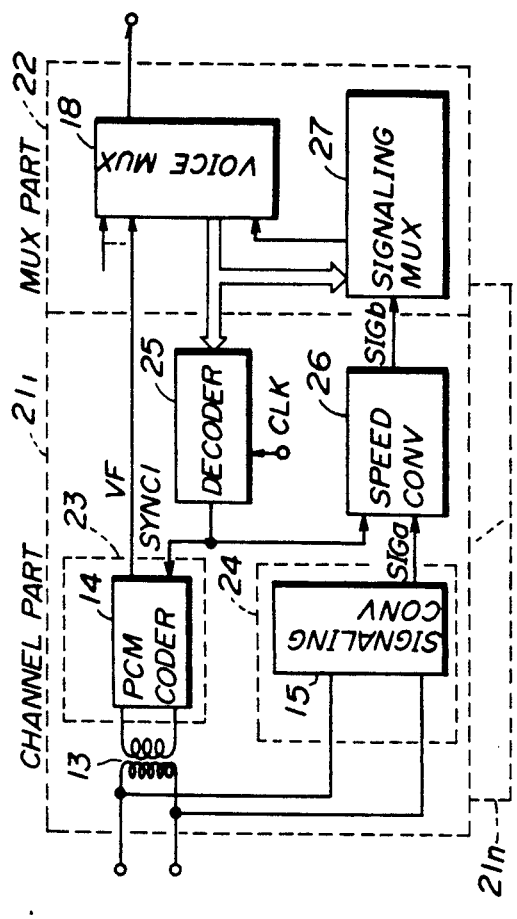
FIG. 3 is a system block diagram showing an essential part of an embodiment of the channel access system according to the present invention.
Figure 4:
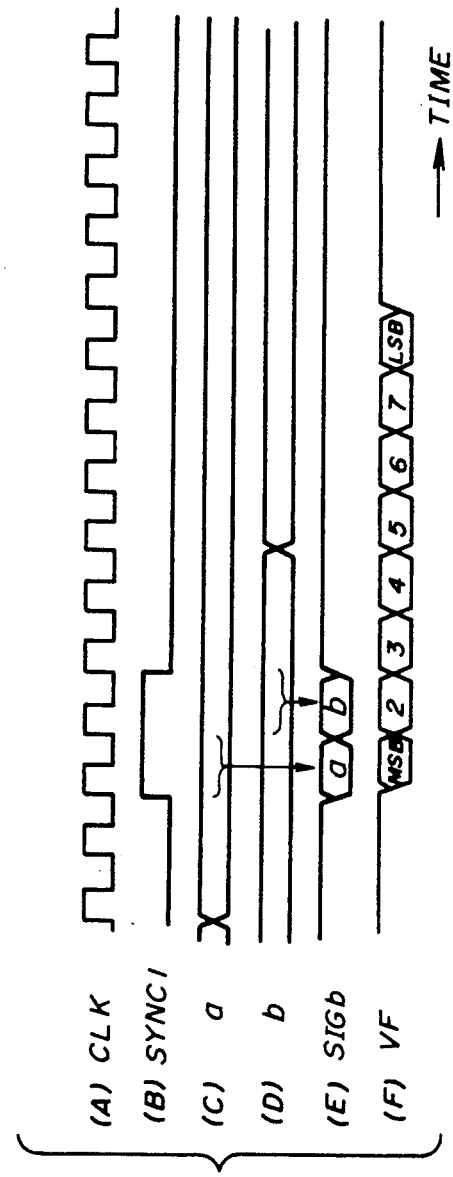
FIGS. 4(A) through 4(F) are time charts for explaining an operation of the embodiment shown in FIG. 3.

Next, a description will be given of an embodiment of the channel access system according to the present invention, by referring to FIGS. 3 and 4. FIG. 3 shows an essential part of this embodiment, and in FIG. 3, those parts which are essentially the same as those corresponding parts in FIGS. 1 and 2 are designated by the same reference numerals, and a description thereof will be omitted.

In FIG. 3, the decoder 25 operates in synchronism with a clock signal CLK shown in FIG. 4(A) and decodes the channel access signals for all channels which are received from the voice multiplexer 18 of the multiplexer part 22. When the decoder 25 detects the channel access signal which designates a particular channel, the decoder 25 outputs a synchronizing signal SYNC1 shown in FIG. 4(B). For example, this synchronizing signal SYNC1 may have a frequency of 8 kHz.

As shown in FIG. 4(F), the PCM coder 14 (23) serially outputs an 8-bit voice frequency data VF which amounts to one time slot in response to the synchronizing signal SYNC1. At the same time, the speed converting circuit 26 receives 2 bits a and b of the signaling data SIGa respectively shown in FIGS. 4(C) and 4(D) from the signaling converter 15 (24) and outputs the two bits a and b as a signaling data SIGb shown in FIG. 4(E) in response to the synchronizing signal SYNC1. This signaling data SIGb is supplied to the signaling multiplexer 27 of the multiplexer part 22.

In other words, the speed converting circuit 26 comprises a parallel-to-serial converter which receives the two bits a and b of the signaling data SIGa in parallel and serially outputs the two bits a and b as the signaling data SIGb in synchronism with the synchronizing signal SYNC1 during a time when the synchronizing signal SYNC1 is received, that is, during a high-level period of the synchronizing signal SYNC1 in the case of this embodiment. In this embodiment, the transmission speed of the signaling data SIGb is the same as the transmission speeds of the clock signal CLK and the voice frequency data VF which is 1.984 Mbit/s.

Accordingly, the voice frequency data VF and the signaling data SIGb are thus obtained in synchronism with the synchronizing signal SYNC1, and the voice frequency data VF is supplied to the voice multiplexer 18 of the multiplexer part 22 while the signaling data SIGb is supplied to the signaling multiplexer 27 of the multiplexer part 22.

The signaling multiplexer 27 converts the transmission speed of the signaling data SIGb from 1.984 Mbit/s into 64 kbit/s which is the same as the transmission speed of the signaling data SIG which is conventionally used as described above in conjunction with FIG. 1. Thereafter, the signaling multiplexer 27 of the multiplexer part 22 adds a multiframe pattern to the signaling data SIG which is received from the speed converting circuit 26 and to signaling data which are received from other channels and time-division-multiplexes these signaling data based on the channel access signal which is received from the voice multiplexer 18. A signaling time division multiplexed signal from the signaling multiplexer 27 is supplied to the voice multiplexer 18.

The voice multiplexer 18 time-division-multiplexes the voice frequency data VF and the signaling time division multiplexed signal according to a predetermined rule and generates a digital signal by adding a frame pattern to the time division multiplexed signal similarly to the conventional channel access system shown in FIG. 1.

Therefore, according to this embodiment, it is possible to omit the transmission lines and the decoder 17 which are conventionally required since there is no need to use the channel access signal for the signaling data SIG.

Figure 5A:
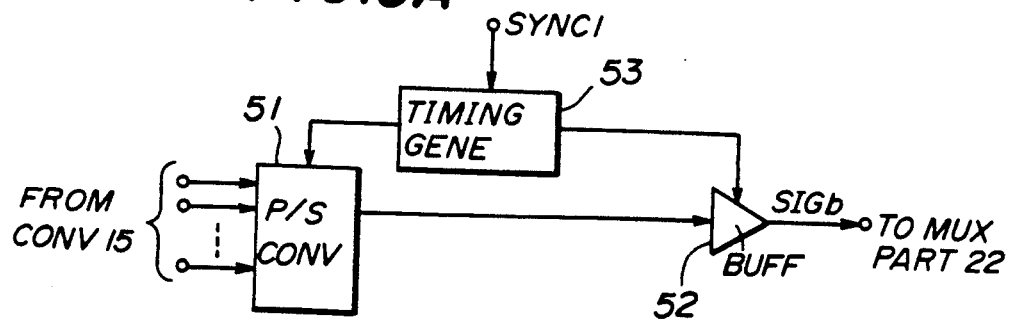
FIGS. 5A and 5B are system block diagrams showing an embodiment of a speed converting circuit shown in FIG. 3.

Next, a description will be given of an embodiment of the speed converting circuit 26, by referring to FIGS. 5A and 5B. FIG. 5A shows an essential part of one of the transmission sides of the speed converting circuit 26, and FIG. 5B shows an essential part of one of the reception sides of the speed converting circuit 26.

In FIG. 5A, a parallel-to-serial (P/S) converter 51 converts n parallel signaling data into one serial signaling data in response to a first timing signal which is received from a timing signal generator 53. The timing signal generator 53 generates first and second timing signals in response to the synchronizing signal SYNC1 of the transmission system. The first timing signal controls the timing with which the parallel-to-serial conversion of the P/S converter 51 starts, while the second timing signal controls the timing with which a gate of an output buffer 52 opens and closes. For example, the output buffer 52 can be an open-collector or an open-drain buffer which receives the serial signaling data output from the P/S converter 51. Responsive to the second timing signal, the output buffer 52 opens the gate thereof only for a time during which the P/S converter 51 successively outputs the n bits of the signaling data. The output buffer 52 supplies the serial signaling data SIGb to the signaling multiplexer 27 of the multiplexer part 22.

Figure 5B:
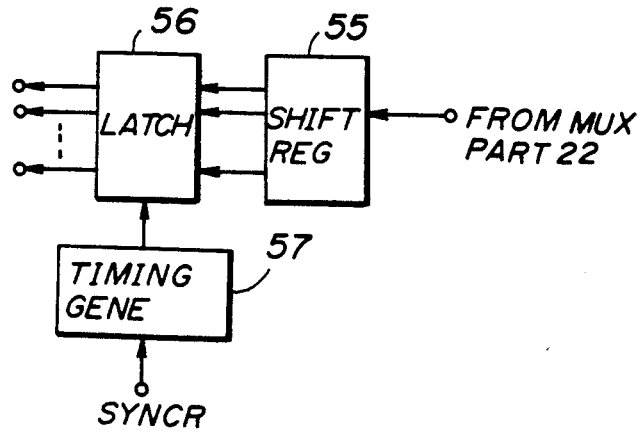

In FIG. 5B, a shift register 55 receives one set of serial signaling data from a reception system of the multiplexer part 22 and converts the serial signaling data into k parallel signaling data. A latch circuit 56 latches the k parallel signaling data from the shift register 55 with a timing which corresponds to its own channel, that is, in response to a third timing signal which is generated by a timing signal generator 57. The timing signal generator 57 generates the third timing signal based on a synchronizing signal SYNCR of the reception system. k output signaling data of the latch circuit 56 are supplied to a signaling converter (not shown) of the reception system.

Figure 6A:
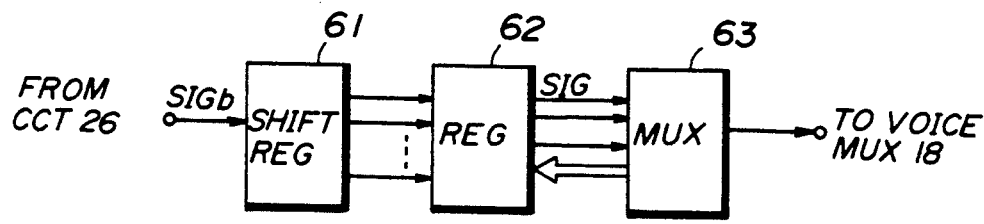
FIGS. 6A and 6B are system block diagrams showing an embodiment of a signaling multiplexer shown in FIG. 3.

Next, a description will be given of an embodiment of the signaling multiplexer 27, by referring to FIGS. 6A and 6B. FIG. 6A shows an essential part of one of the transmission side of the signaling multiplexer 27, and FIG. 6B shows an essential part of one of the reception side of the signaling multiplexer 27.

In FIG. 6A, a shift register 61 receives the serial signaling data SIGb from the speed converting circuit 26 and converts the serial signaling data SIGb into k parallel signaling data. A register (or a memory) 62 receives the k parallel signaling data from the shift register 61 and temporarily holds the k parallel signaling data as data in units of channels. A known multiplexer 63 multiplexes the k parallel signaling data and supplies a resulting multiplexed signal to the voice multiplexer 18 within the multiplexer part 22. In addition, the multiplexer 63 also supplies a timing signal to the register 62 so as to control the multiplexing timing of the register 62.

Figure 6B:
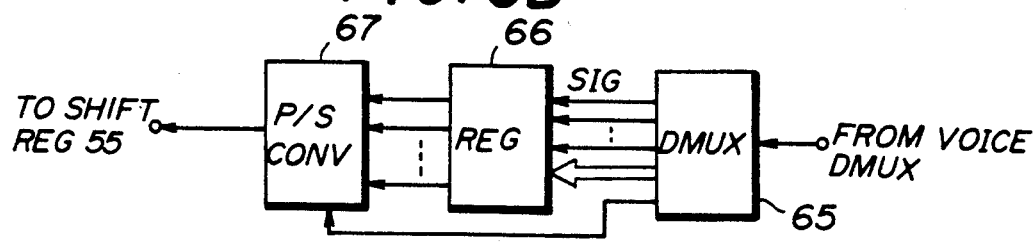

In FIG. 6B, a demultiplexer 65 receives the signaling data from a voice demultiplexer (not shown) of the reception system and separates the signaling data in units of channels. A register (or a memory) 66 temporarily holds the signaling data in units of channels with a timing which is controlled by a timing signal from the demultiplexer 65. A parallel-to-serial (P/S) converter 67 converts the signaling data received from the register 66 into one of the serial signaling data with a timing controlled by a timing signal from the demultiplexer 65. The serial signaling data output from the P/S converter 67 is supplied to the reception system of the speed converting circuit 26, that is, to the shift register 55 shown in FIG. 5B.

In the described embodiment, the transmission speed of the signaling data SIGb is set approximately equal to the transmission speed of the voice frequency data VF. However, the transmission speed of the signaling data SIGb may be set to 1/N the transmission speed of the voice frequency data, where N is an arbitrary number such as 2 and 4, for example, so that the transmission speed of the signaling data SIGb is of the same order as the transmission speed of the voice frequency data VF. In this case, it is still possible to use the same synchronizing signal SYNC1 for controlling the operations of the coder 14 and the speed converting circuit 26, because the transmission speed of the signaling data SIGb is of the same order as the transmission speed of the voice frequency data VF.

Further, the present invention is not limited to these embodiments, but various variations and modifications may be made without departing from the scope of the present invention.

What is claimed is:

1. A channel access system comprising:
   n channel parts for receiving m channels of voice signals and for outputting voice frequency data and signaling data; and a multiplexer part for receiving the voice frequency data and the signaling data of the m channels from said n channel parts and for supplying channel access signals to said n channel parts for designating a channel of the voice frequency data, each of said n channel parts including:

a coder for coding a corresponding one of said voice signals into one of said voice frequency data;

a decoder for decoding the channel access signals and for generating a synchronizing signal which is synchronized to a corresponding one of said channel access signals which designates a particular channel;

a signaling converter for converting the corresponding one of said voice signals into a corresponding one of said signaling data having a first transmission speed; and a speed converting circuit for converting the transmission speed of said signaling data from the first transmission speed to a second transmission speed which is higher than the first transmission speed, said synchronizing signal controlling a coding timing of said coder and a speed conversion timing of said speed converting circuit.

2. The channel access system as claimed in claim 1 wherein the second transmission speed of the signaling data is substantially the same as a transmission speed of the voice frequency data.

3. The channel access system as claimed in claim 1 wherein the second transmission speed of the signaling data is 1/N the transmission speed of the voice frequency data, where N is an arbitrary number such that the second transmission speed is substantially the same as the transmission speed of the voice frequency data.

4. The channel access system as claimed in claim 1 wherein said multiplexer part comprises a voice multiplexer for multiplexing the voice frequency data which are received from said n channel parts and for supplying the channel access signals to said decoder, and a signaling multiplexer for converting the second transmission speed of the signaling data from said speed converting circuit into a third transmission speed which is lower than the second transmission speed and for multiplexing the signaling data which have the third transmission speed and are obtained for each of said n channel parts to produce a multiplexed signal which is supplied to said voice multiplexer.

5. The channel access system as claimed in claim 4 wherein said signaling multiplexer adds a multiframe pattern when multiplexing the signaling data having the third transmission speed to produce the multiplexed signal.

6. The channel access system as claimed in claim 5 wherein said voice multiplexer generates a digital signal which has a frame structure by multiplexing the voice frequency data and the multiplexed signal and adding a frame pattern thereto.

7. The channel access system as claimed in claim 4 wherein said signaling multiplexer comprises:

a shift register for converting the signaling data having the second transmission speed into parallel signaling data;

a register for converting the parallel signaling data into the signaling data having the third transmission speed; and a parallel signaling data multiplexer for multiplexing the parallel signaling data into said multiplexed signal, said parallel signaling data multiplexer supplying a timing signal for controlling an operation timing of said register.

8. The channel access system as claimed in claim 1 wherein said speed converting circuit comprises a timing generator for generating first and second timing signals in response to said synchronizing signal, a parallel-to-serial converter for converting the signaling data having the first transmission speed into a serial signaling data in response to the first timing signal, and an output buffer for outputting the serial signaling data as the signaling data having the second transmission speed in response to the second timing signal.

9. The channel access system as claimed in claim 1 wherein said channel part further comprises a transformer for receiving an analog signal from a switching system, said coder receiving the voice signals via said transformer, said signaling converter receiving the signal from the switching system via a primary side of said transformer.

* * * * *